E. H. BAKER.
WAGON BRAKE.
APPLICATION FILED JUNE 21, 1916.
1,231,472.
Patented June 26, 1917.
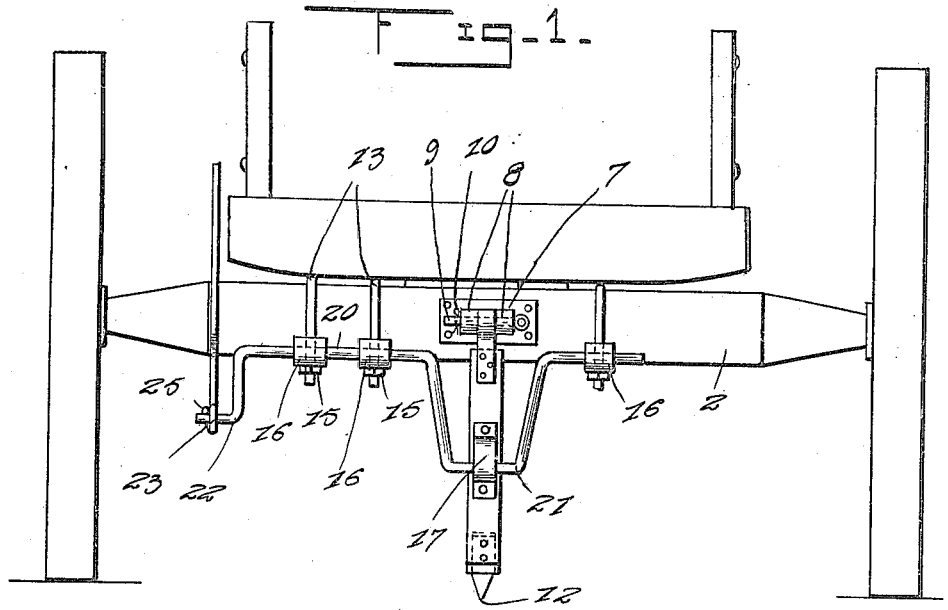
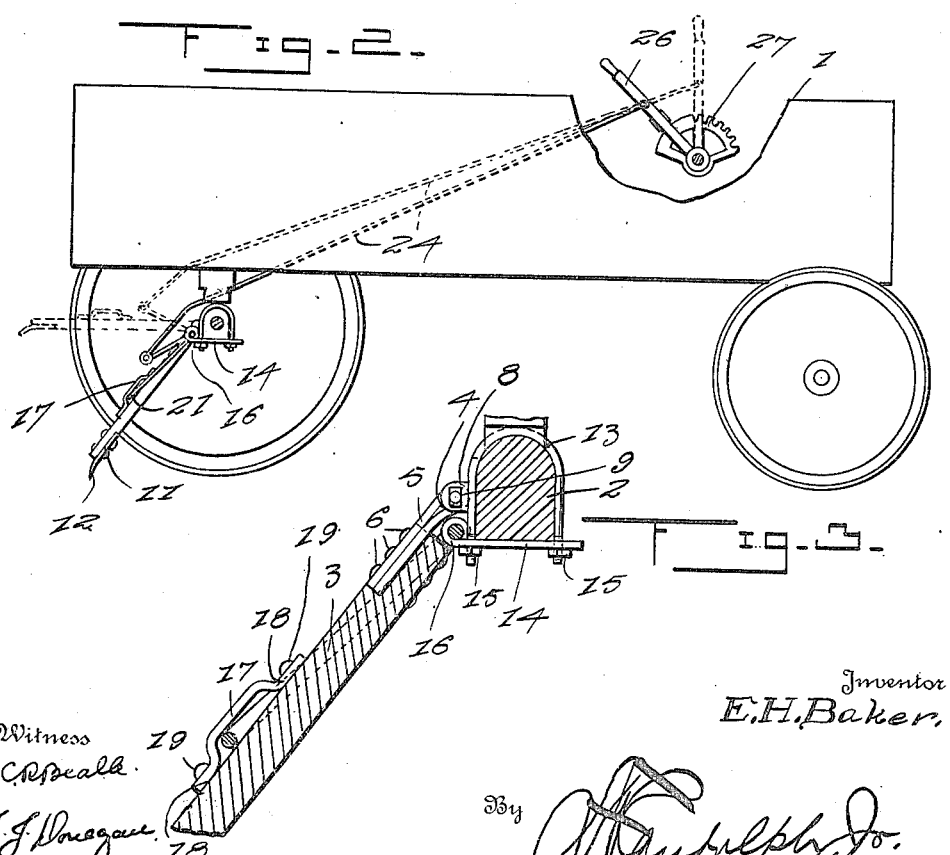
Witness
C. R. Beale
J. J. Donegan
Inventor
E. H. Baker,
By
Attorney

UNITED STATES PATENT OFFICE.

ELLIS H. BAKER, OF WHITLASH, MONTANA.

WAGON-BRAKE.

1,231,472.  Specification of Letters Patent.  Patented June 26, 1917.

Application filed June 21, 1916. Serial No. 105,011.

*To all whom it may concern:*

Be it known that I, ELLIS H. BAKER, a citizen of the United States, residing at Whitlash, in the county of Hill and State of Montana, have invented certain new and useful Improvements in Wagon-Brakes; and I do hereby declare the following to be a full, clear, and exact description of the invention, such as will enable others skilled in the art to which it appertains to make and use the same.

The primary object of this invention is the provision of a novel type of drag brake for a wagon, which can be manufactured cheaply, will be durable and efficient in operation and can be conveniently and expeditiously associated with the wagon or removed therefrom.

Other objects will appear and be better understood from that embodiment of my invention of which the following is a specification, reference being had to the accompanying drawing forming a part thereof, in which:

Figure 1 is a rear end view of a wagon body, showing the brake applied thereto,

Fig. 2 is a side elevation of a wagon body, showing the brake applied thereto and in operative position, and Fig. 3 is a longitudinal sectional view, taken through the drag bar of the brake.

Referring to the drawing in detail, the numeral 1 designates a wagon body having a rear axle 2 of ordinary construction.

The brake mechanism consists of a drag bar 3, which has one end thereof recessed, and connected to the mentioned end of the drag bar is a piece of strap iron which is bent upon itself and formed to provide a loop or eye 4, the opposite ends of the wire being arranged in superposed relation, as shown at 5, and fitted within the recess in the end of the bar and secured in place by means of fastening bolts 6, which extend through the superposed ends 5 and through the adjacent end of the drag bar 3.

A plate 7 is mounted on the rear side of the rear axle 2, and has a pair of spaced eyes 8 formed thereon, which receive therebetween the loop portion 4 and aline therewith, for the accommodation of a bolt 9, which extends through the eyes 8 and loop 4, and has one end provided with an opening for the reception of a cotter pin 10. By virtue of so connecting the bar 3 to the axle 2, said bar can have vertical swinging movement, as shown in dotted lines upon the drawing. The outer or free end of the bar 3 has its under side recessed, for the accommodation of a foot 11, which has one end projecting beyond the free end of the bar 3 and pointed, as shown at 12.

A plurality of U-shaped attaching members 13 engage around the rear axle 2, and a plurality of transversely extending plates 14 underlie the rear axle 2 and have openings therein for the reception of the free ends of the U-shaped members 13, the said ends of the members 13 being threaded for the reception of nuts 15, which are adjustable against the under side of the plates 14, so as to hold the plates in operative position. The outer ends of the plates 14 are formed to provide eyes 16, all of which are disposed in alinement.

An inverted U-shaped member 17 is mounted on the upper side of the drag bar 3, at a point intermediate the ends of the drag bar 3, and has the ends of the sides extended in parallelism with the drag bar 3, as shown at 18, and secured to the drag bar by means of fastening elements 19.

An operating shaft 20 is located in rear of the axle 2 and is journaled in the eyes 16 on the plate 14. The shaft 20 has a U-shaped crank portion 21 formed thereon, which is received by the U-shaped member 17 on the drag bar 3, as shown more particularly in Figs. 1 and 3 of the drawing. One end of the crank 20 is bent to provide an L-shaped crank 22, the short arm of which is received by an eye 23 formed in the lower end of a diagonally disposed operating rod 24, the said short arm of the L-shaped crank 22 having an opening therein for the reception of a cotter pin 25, which serves to hold the operating rod 24 in operative position upon the short arm of the crank 22. The upper end of the rod 24 has connection with an operating lever 26, which carries suitable pawl mechanism for engagement in the teeth of a segmental rack 27 carried by one side of the wagon body.

When the lever 26 is moved to the full line position shown in Fig. 2, the shaft 20 will be rotated so as to effect lowering of the free end of the drag bar 3, so as to admit of the pointed end of the foot 11 engaging in the ground. The drag bar 3 is adapted to be lowered to operative position especially when the wagon is stopped on a grade, so as to prevent backing of the wagon.

Having thus described my invention what I claim as new, is:

The combination with the rear axle of a vehicle, of a drag bar having one end pivotally connected to the axle, a U-shaped element secured to the drag bar at a point intermediate the ends thereof, a shaft journaled on the axle and provided with a U-shaped crank portion, the said U-shaped crank portion having the connecting portion for the sides thereof extending through the U-shaped element on the drag bar so as to effect movement of the drag bar when the shaft is operated, and means for operating the shaft.

In testimony whereof I affix my signature in presence of two witnesses.

ELLIS H. BAKER.

Witnesses:
 LOUIS AMOZ DROZ,
 SAM A. DEMPSTER.

Copies of this patent may be obtained for five cents each, by addressing the "Commissioner of Patents, Washington, D. C."